(12) United States Patent
Jones-McFadden

(10) Patent No.: US 10,002,248 B2
(45) Date of Patent: Jun. 19, 2018

(54) MOBILE DEVICE DATA SECURITY SYSTEM

(71) Applicant: BANK OF AMERICA CORPORATION, Charlotte, NC (US)

(72) Inventor: Alicia C. Jones-McFadden, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 83 days.

(21) Appl. No.: 14/987,745

(22) Filed: Jan. 4, 2016

(65) Prior Publication Data

US 2017/0193228 A1    Jul. 6, 2017

(51) Int. Cl.
*G06F 21/55* (2013.01)
*G06F 21/56* (2013.01)

(52) U.S. Cl.
CPC ............ *G06F 21/554* (2013.01); *G06F 21/56* (2013.01); *G06F 21/564* (2013.01)

(58) Field of Classification Search
CPC .................................................... G06F 21/564
See application file for complete search history.

(56) References Cited

U.S. PATENT DOCUMENTS

| | | | |
|---|---|---|---|
| 5,475,839 A * | 12/1995 | Watson | G06F 11/08 713/155 |
| 5,655,004 A | 8/1997 | Holbrook et al. | |
| 7,071,113 B2 | 7/2006 | Kim et al. | |
| 7,600,676 B1 | 10/2009 | Rados et al. | |
| 7,707,120 B2 | 4/2010 | Dominguez et al. | |

(Continued)

FOREIGN PATENT DOCUMENTS

GB            401015 A       11/1933

OTHER PUBLICATIONS

Meyer, Roger. Secure Authentication on the Internet (Apr. 4, 2007). Retrieved online Mar. 27, 2012. http://www.sans.org/reading_room/whitepapers/securecode/secure-authentication-internet_2084. 36 pps.

(Continued)

*Primary Examiner* — James R Turchen
(74) *Attorney, Agent, or Firm* — Michael A. Springs; Moore & Van Allen PLLC; Anup Shrinivasan

(57) ABSTRACT

Systems, computer program products, and methods are described herein for a mobile device data security system. The present invention is configured to establish a communication link with the mobile device; receive, via the established communication link, information associated with one or more third-party applications stored on the mobile device; initiate a scan, via the established communication link, to determine whether the one or more third-party applications are associated with a malicious code; transmit control signals, via the established communication link, configured to cause the data security application to begin running in the background of the mobile device in response to determining that the one or more third-party applications are associated with the malicious code; and initiate, via the data security application, one or more actions to be executed on the mobile device of the user, wherein the one or more actions limit one or more functionalities of the mobile device.

14 Claims, 6 Drawing Sheets

(56) References Cited

U.S. PATENT DOCUMENTS

| | | | |
|---|---|---|---|
| 7,769,991 | B2 | 8/2010 | Niemla |
| 7,899,753 | B1 | 3/2011 | Everhart |
| 7,900,262 | B2 | 3/2011 | Ozawa |
| 8,087,085 | B2 | 12/2011 | Hu et al. |
| 8,195,576 | B1 | 6/2012 | Grigg et al. |
| 8,312,545 | B2 | 11/2012 | Tuvell et al. |
| 8,341,749 | B2 | 12/2012 | Rogel |
| 8,346,666 | B2 | 1/2013 | Lindelsee et al. |
| 8,355,982 | B2 | 1/2013 | Hazel et al. |
| 8,380,177 | B2 | 2/2013 | Laracey |
| 8,522,039 | B2 | 8/2013 | Hyndman et al. |
| 8,572,391 | B2 | 10/2013 | Golan et al. |
| 8,595,491 | B2 | 11/2013 | Nice et al. |
| 8,635,157 | B2 | 1/2014 | Smith et al. |
| 8,713,684 | B2 | 4/2014 | Bettini et al. |
| 8,782,792 | B1 * | 7/2014 | Bodke ............ G06F 21/53 713/187 |
| 8,819,772 | B2 | 8/2014 | Bettini et al. |
| 8,844,038 | B2 | 9/2014 | Niemela |
| 8,863,279 | B2 | 10/2014 | McDougal et al. |
| 8,904,525 | B1 | 12/2014 | Hodgman et al. |
| 8,984,632 | B1 * | 3/2015 | Laffoon ............ H04L 67/34 713/187 |
| 9,058,607 | B2 | 6/2015 | Ganti et al. |
| 9,064,115 | B2 | 6/2015 | Tuvell et al. |
| 9,069,957 | B2 | 6/2015 | Tuvell et al. |
| 9,104,871 | B2 | 8/2015 | Tuvell et al. |
| 9,143,529 | B2 | 9/2015 | Qureshi et al. |
| 9,363,278 | B2 * | 6/2016 | Maria ............ H04L 63/1416 |
| 9,654,982 | B2 * | 5/2017 | Bank ............ H04L 63/14 |
| 2006/0021003 | A1 | 1/2006 | Fisher et al. |
| 2006/0073811 | A1 | 4/2006 | Ekberg |
| 2006/0123465 | A1 | 6/2006 | Ziegler |
| 2007/0030539 | A1 * | 2/2007 | Nath ............ G06F 21/305 358/520 |
| 2009/0254975 | A1 | 10/2009 | Turnbull et al. |
| 2009/0265775 | A1 | 10/2009 | Wisely et al. |
| 2010/0051685 | A1 | 3/2010 | Royyuru et al. |
| 2010/0125495 | A1 | 5/2010 | Smith et al. |
| 2011/0047597 | A1 * | 2/2011 | Mahaffey ............ G06F 21/564 726/3 |
| 2011/0145920 | A1 * | 6/2011 | Mahaffey ............ G06F 21/564 726/22 |
| 2012/0151559 | A1 | 6/2012 | Koudys et al. |
| 2012/0197740 | A1 | 8/2012 | Grigg et al. |
| 2012/0265631 | A1 | 10/2012 | Cronic et al. |
| 2012/0329388 | A1 * | 12/2012 | Royston ............ H04W 4/008 455/41.1 |
| 2013/0023240 | A1 | 1/2013 | Weiner |
| 2013/0174265 | A1 * | 7/2013 | Chan ............ G06F 12/1408 726/26 |
| 2013/0226800 | A1 | 8/2013 | Patel et al. |
| 2013/0232542 | A1 | 9/2013 | Cheng et al. |
| 2013/0275303 | A1 | 10/2013 | Fiore et al. |
| 2013/0282588 | A1 | 10/2013 | Hruska |
| 2013/0347100 | A1 | 12/2013 | Tsukamoto et al. |
| 2014/0372308 | A1 | 12/2014 | Sheets |
| 2015/0220907 | A1 | 8/2015 | Denton et al. |
| 2016/0134488 | A1 | 5/2016 | Straub et al. |
| 2016/0173506 | A1 * | 6/2016 | Bank ............ H04L 63/14 726/23 |
| 2016/0180322 | A1 | 6/2016 | Song et al. |
| 2016/0255050 | A1 | 9/2016 | Grayson et al. |

OTHER PUBLICATIONS

Rocha et al.; A2BeST: An adaptive authentication service based on mobile user's behavior and spatio-temporal context; Published in: Computers and Communications (ISCC), 2011 IEEE Symposium on; Date of Conference: Jun. 28-Jul. 1, 2011; 2011; IEEE Xplore.

Xiang et al.; A spatial entropy-based approach to improve mobile risk-based authentication; Published in: Proceeding GeoPrivacy '14 Proceedings of the 1st ACM SIGSPATIAL International Workshop on Privacy in Geographic Information Collection and Analysis Article No. 3; 2014; ACM Digital Library.

* cited by examiner

MOBILE DEVICE DATA SECURITY SYSTEM

BACKGROUND

Mobile commerce transactions are starting to become increasingly common among the general public with the growing popularity of smartphones and tablets. While security software is commonly used on laptops and desktops, the majority of mobile devices today remain devoid of security protection and are exposed to a new growing breed of mobile malware. Mobile devices are attractive targets because they are well-connected, often incorporating various means of wireless communication, and capable of performing mobile commerce transactions on a regular basis. There is a need for a system to detect the presence of malicious code and take action accordingly. The present invention addresses this issue by implementing a mobile device data security system to identify the presence of malicious code.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a mobile device data security system is presented. The system comprises: at least one non-transitory storage device; at least one processor; and at least one module stored in said storage device and comprising instruction code that is executable by the at least one processor and configured to cause said at least one processor to: provide a data security application for installation on a mobile device of a user; establish a communication link with the mobile device, wherein establishing further comprises creating a wireless data channel with the mobile device; receive, via the established communication link, information associated with one or more third-party applications stored on the mobile device; initiate a scan, via the established communication link, to determine whether the one or more third-party applications are associated with a malicious code; transmit control signals, via the established communication link, configured to cause the data security application to begin running in the background of the mobile device in response to determining that the one or more third-party applications are associated with the malicious code; and initiate, via the data security application, one or more actions to be executed on the mobile device of the user based on at least determining that the one or more third-party applications are associated with the malicious code, wherein the one or more actions limit one or more functionalities of the mobile device.

In some embodiments, the module is further configured to cause the at least one processor to: determine one or more actions to be taken by the user in response to determining that the one or more third-party applications are associated with the malicious code, wherein the one or more actions mitigates one or more effects of the malicious code; and transmit, via the established communication link, the one or more actions to the user.

In some embodiments, the module is further configured to cause the at least one processor to: receive an indication that the user has executed the one or more actions; initiate a scan, via the established communication link, to determine whether the one or more third-party applications continue to be associated with the malicious code; determine that the one or more third-party applications are not associated with the malicious code; and restore the one or more functionalities of the mobile device in response to determining that the one or more third-party applications are not associated with the malicious code.

In some embodiments, the module is further configured to cause the at least one processor to determine that the malicious code is associated with tracking the user's use of an input device associated with the mobile device.

In some embodiments, the module is further configured to cause the at least one processor to disable user access to the one or more third-party applications in response to determining that the one or more third-party applications are associated with the malicious code.

In some embodiments, the module is further configured to cause the at least one processor to disable user access to one or more features associated with the one or more third-party applications.

In some embodiments, the module is further configured to cause the at least one processor to retrieve one or more user preferences associated with disabling user access, wherein the user preferences indicate one or more specific features associated with the one or more third-party applications to which user access is disabled when a malicious code is detected.

In some embodiments, the module is further configured to cause the at least one processor to: determine a sensitivity score associated with the one or more third-party applications indicating which of the one or more third-party applications require protection from unauthorized access to safeguard privacy and/or security of the user; and determine one or more specific features associated with the one or more third-party applications based on at least the sensitivity score associated with the one or more third-party applications.

In another aspect, a computerized method for remotely controlling access to a mobile device is presented. The method comprises: providing, using a computing device processor, a data security application for installation on a mobile device of a user; establishing, using a computing device processor, a communication link with the mobile device, wherein establishing further comprises creating a wireless data channel with the mobile device; receiving, via the established communication link, information associated with one or more third-party applications stored on the mobile device; initiating a scan, via the established communication link, to determine whether the one or more third-party applications are associated with a malicious code; transmitting control signals, via the established communication link, configured to cause the data security application to begin running in the background of the mobile device in response to determining that the one or more third-party applications are associated with the malicious code; and initiating, via the data security application, one or more actions to be executed on the mobile device of the user based on at least determining that the one or more third-party applications are associated with the malicious code, wherein the one or more actions limit one or more functionalities of the mobile device.

In yet another aspect, a computer program product for mobile device data security system is presented. The computer program product comprising a non-transitory computer-readable medium comprising code causing a first apparatus to: provide a data security application for installation on a mobile device of a user; establish a communication link with the mobile device, wherein establishing further comprises creating a wireless data channel with the mobile device; receive, via the established communication link, information associated with one or more third-party applications stored on the mobile device; initiate a scan, via the established communication link, to determine whether the one or more third-party applications are associated with a malicious code; transmit control signals, via the established communication link, configured to cause the data security application to begin running in the background of the mobile device in response to determining that the one or more third-party applications are associated with the malicious code; and initiate, via the data security application, one or more actions to be executed on the mobile device of the user based on at least determining that the one or more third-party applications are associated with the malicious code, wherein the one or more actions limit one or more functionalities of the mobile device

BRIEF DESCRIPTION OF THE FIGURES

Figure 1:
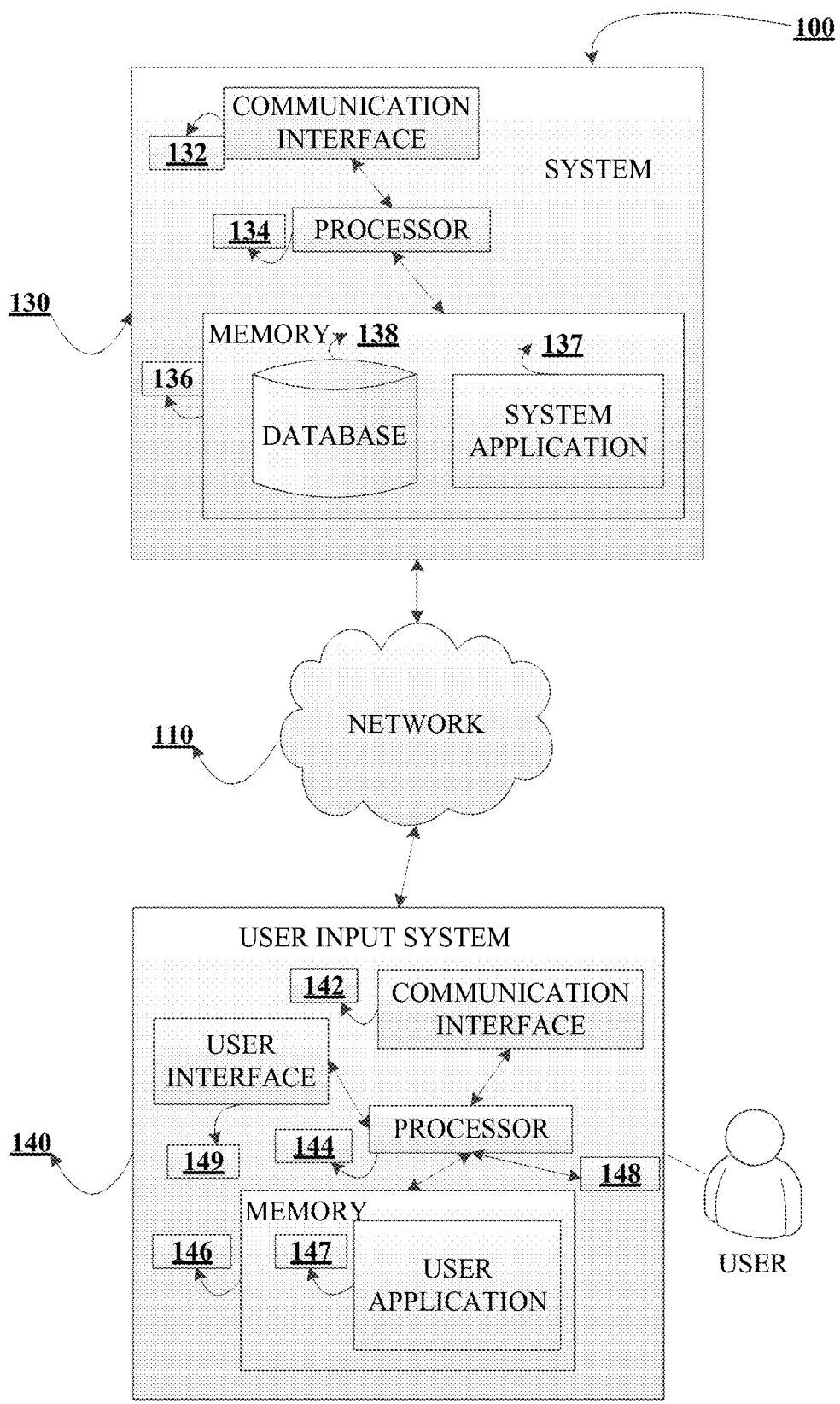
Figure 2:
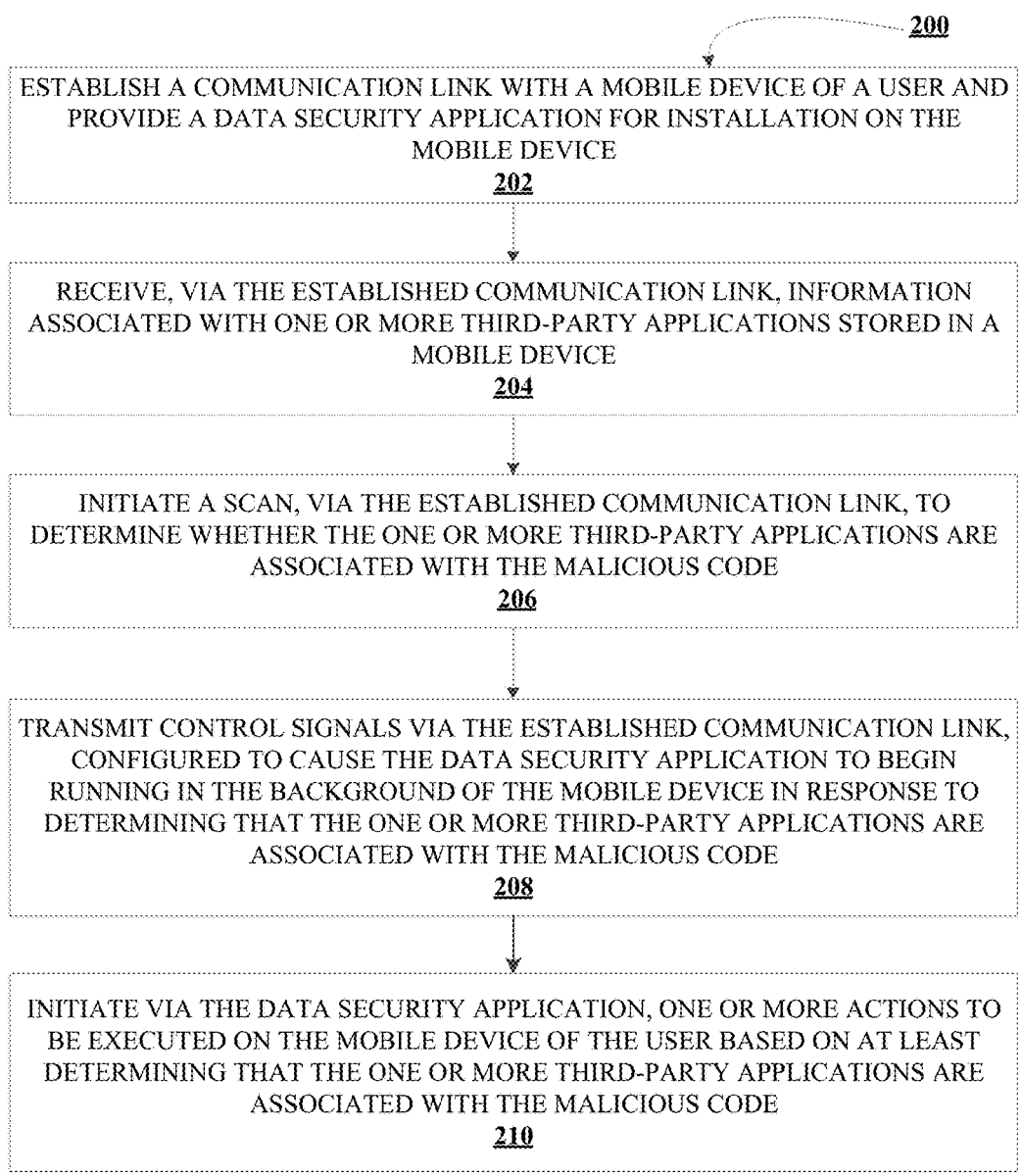

Having thus described embodiments of the invention in general terms, reference will now be made to the accompanying drawings, where:

FIG. 1 illustrates a system environment for implementing the process flows described herein, in accordance with an embodiment of the invention;

FIG. 2 illustrates a high-level process flow for a mobile device data security system, in accordance with an embodiment of the invention.

Figure 3A:
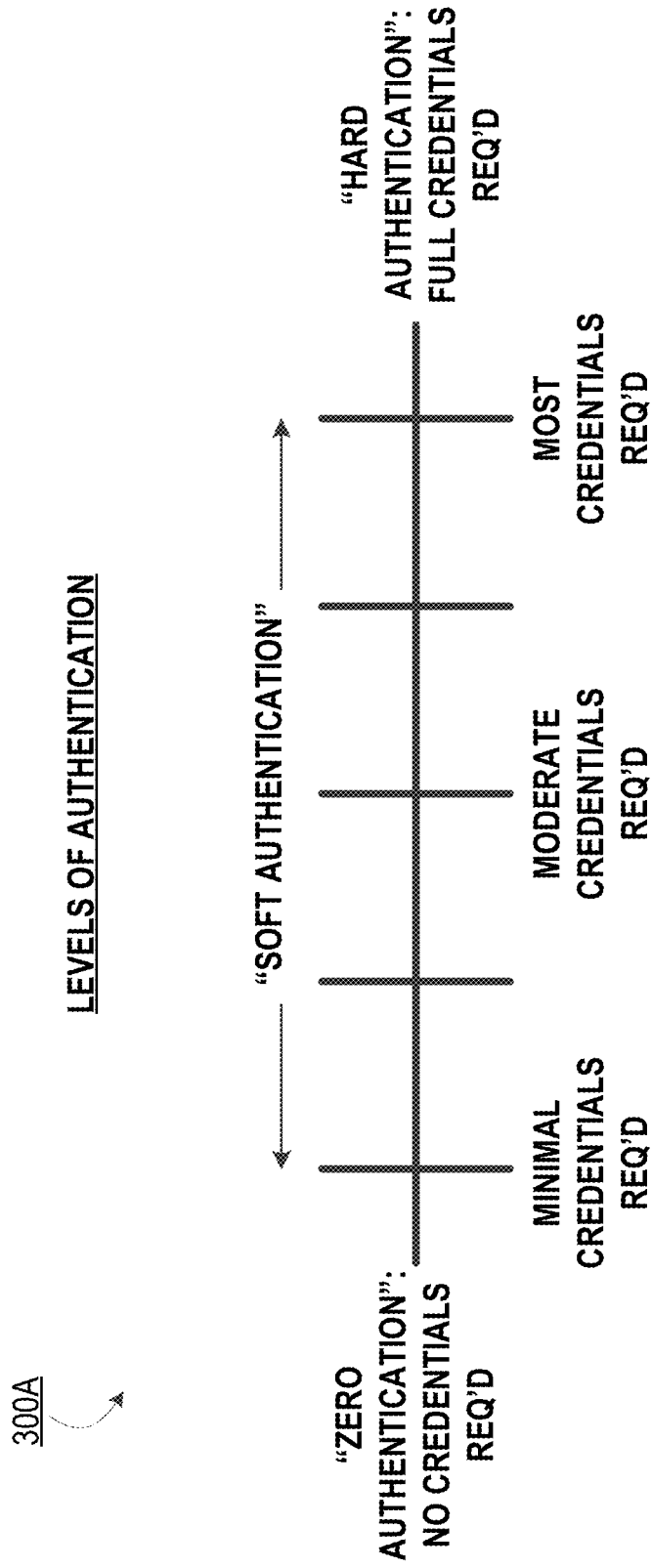
Figure 3B:
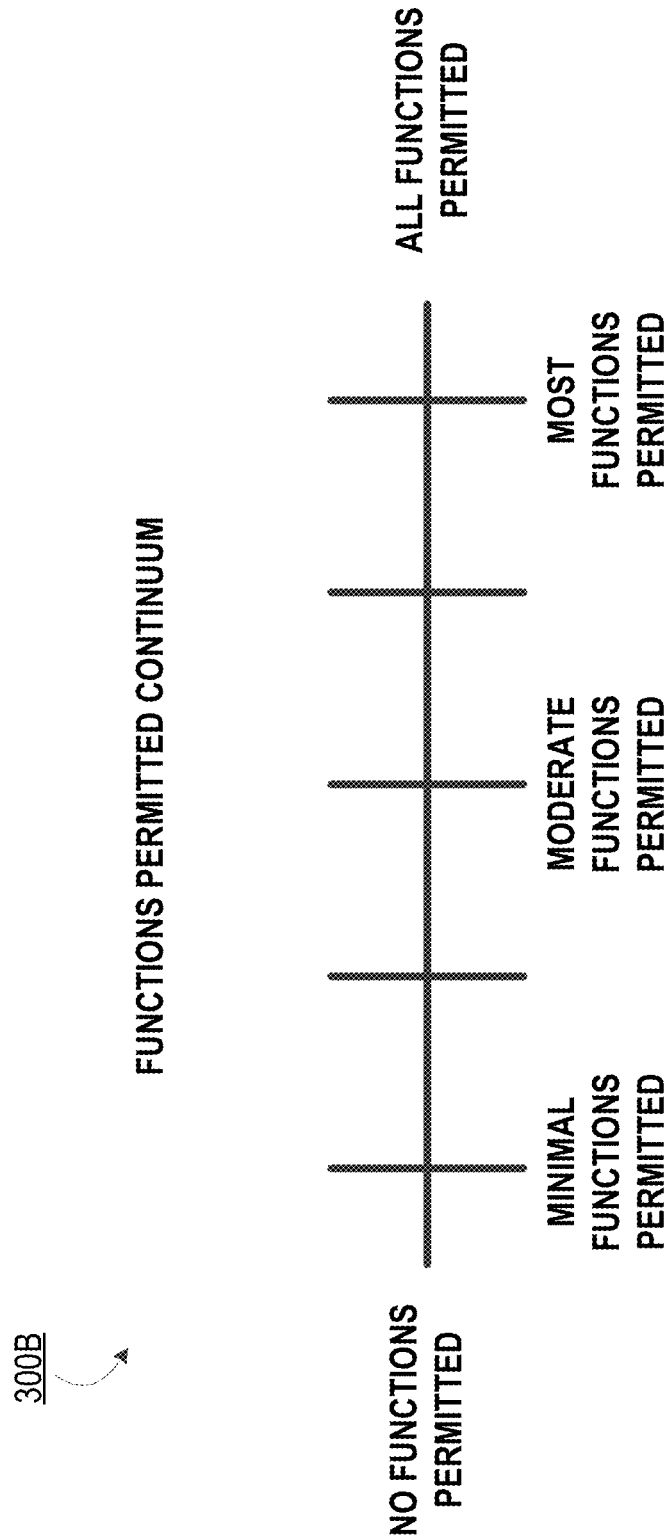
Figure 3C:
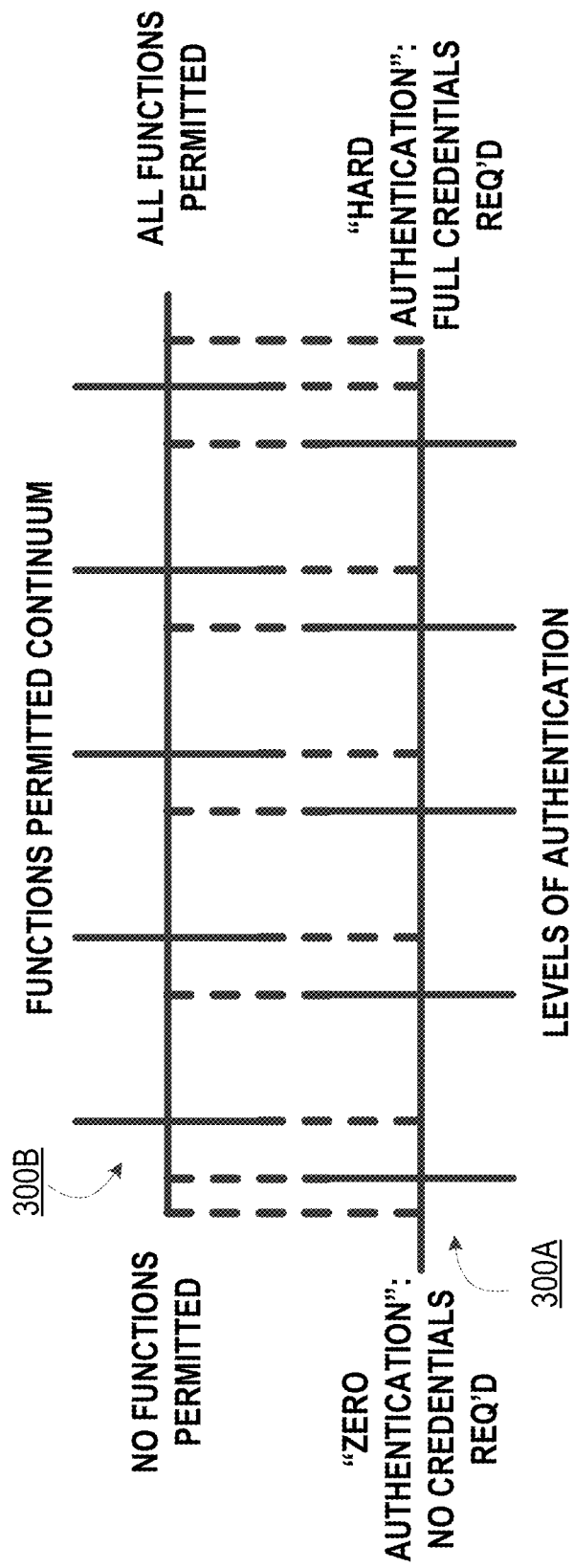
Figure 3D:
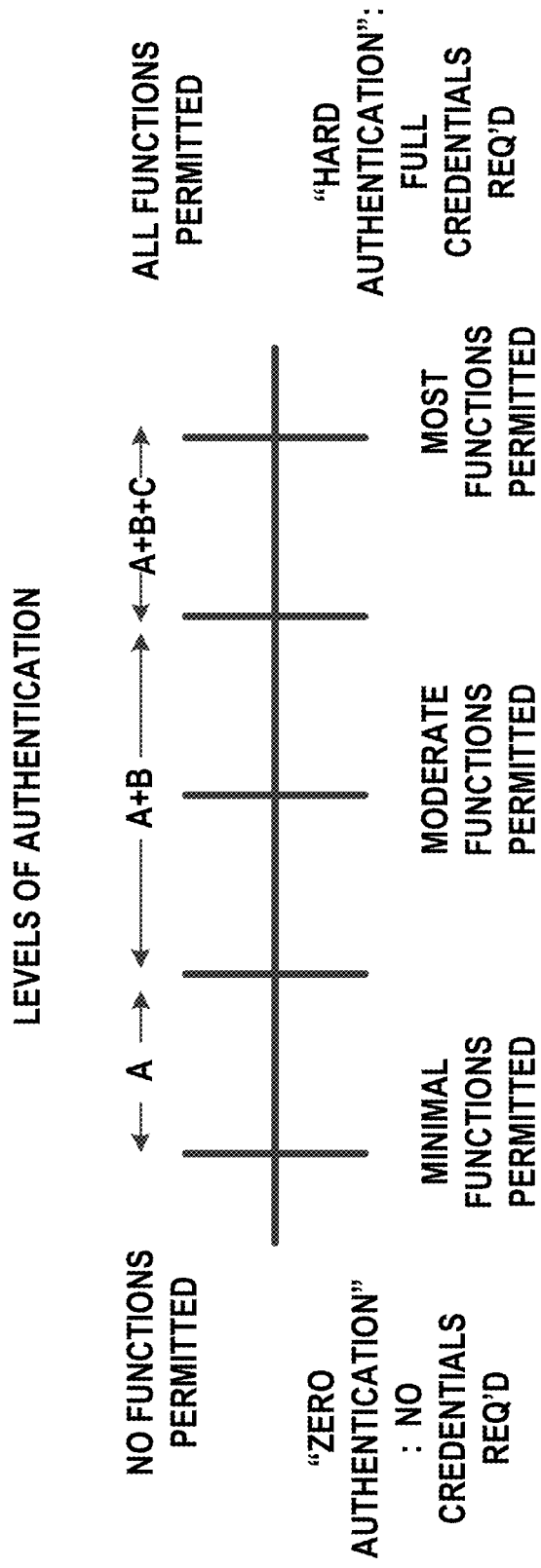

FIG. 3A presents an illustration of the authentication continuum in accordance to one embodiment of the invention;

FIG. 3B presents an illustration of the functions permitted continuum in accordance to one embodiment of the invention;

FIG. 3C presents an illustration of the coupling of the functions permitted continuum and the levels of authentication continuum in accordance to one embodiment of the invention; and FIG. 3D presents an illustration of the relationship between the functions permitted and the authentication types in accordance to one embodiment of the invention.

DETAILED DESCRIPTION OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Mobile device is a rapidly replacing personal computers at home and in the workplace. Smart phones and tablets are being extensively used for a variety of purposes ranging from web surfing to e-commerce transactions to online banking. Financial institutions are beginning to recognize the advantages of the mobile Internet age to overcome the challenges of closer engagement with customers and cost reduction. This has resulted in a switching focus towards online banking services and smartphone apps. This increasing reliance on mobile devices has created an emerging exposure to a new class of malicious attacks on mobile devices. The present invention provides the functional benefit of identifying malicious code on a mobile device and executing one or more actions to mitigate the effect of the malicious code on one or more other applications stored on the mobile device, including online banking applications. In this regard the present invention determines applications and other software on the mobile device and whether any of these items have malicious code associated with them or have been deemed unsafe for use. Typically, the one or more applications are unsafe for use if the malicious code store thereon has been known to have a detrimental effect on the one or more affected applications, such as if the malicious code has been known to track an input device associated with the mobile device. In doing so, the system may then restrict certain actions on the phone, such as, restricting a particular input device, and/or suggest one or more fixes to remove or remedy the effect of the malicious code. In some cases, the system may also disable certain functions of the mobile device in response to detecting malicious code.

In some embodiments, an "entity" as used herein may be a financial institution. A "facility" may be physical premises associated with the entity. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user profile that includes only personal information associated with the user, etc. The account is associated with and/or maintained by the entity. In other embodiments, an "entity" may not be a financial institution. In other embodiments, an entity may or may not allow the user to establish an account associated with the entity.

In some embodiments, the "user" may be a customer (e.g., an account holder or a person who has an account (e.g., banking account, credit account, etc.) at the entity) or potential customer (e.g., a person who has submitted an application for an account, a person who is the target of marketing materials that are distributed by the entity, a person who applies for a loan that not yet been funded). In some other embodiments the "user" may be a person that executes a misappropriate mobile commerce transaction.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

In accordance with embodiments of the invention the terms "customer" and "user" and "consumer" may be interchangeable. These terms may relate to a direct customer of the financial institution or person or entity that has authorization to act on behalf of the direct customer, user, or consumer (i.e., indirect customer).

FIG. 1 presents an exemplary block diagram of the system environment 100 for implementing the process flows described herein in accordance with embodiments of the present invention. As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute a user application 147. The user application 147 may be an application to communicate with the system 130, perform a transaction, input information onto a user interface presented on the user input system 140, or the like. The user application 147 and/or the system application 137 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

The user input system 140 may include any computerized apparatus that can be configured to perform any one or more of the functions of the user input system 140 described and/or contemplated herein. For example, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like. In some embodiments, for example, the user input system 140 may include a personal computer system (e.g. a non-mobile or non-portable computing system, or the like), a mobile computing device, a personal digital assistant, a mobile phone, a tablet computing device, a network device, and/or the like. As illustrated in FIG. 1, in accordance with some embodiments of the present invention, the user input system 140 includes a communication interface 142, a processor 144, a memory 146 having an user application 147 stored therein, and a user interface 149. In such embodiments, the communication interface 142 is operatively and selectively connected to the processor 144, which is operatively and selectively connected to the user interface 149 and the memory 146. In some embodiments, the user may use the user application 147 to execute processes described with respect to the process flows described herein. Specifically, the user application 147 executes the process flows described herein.

Each communication interface described herein, including the communication interface 142, generally includes hardware, and, in some instances, software, that enables the user input system 140, to transport, send, receive, and/or otherwise communicate information to and/or from the communication interface of one or more other systems on the network 110. For example, the communication interface 142 of the user input system 140 may include a wireless transceiver, modem, server, electrical connection, and/or other electronic device that operatively connects the user input system 140 to another system such as the system 130. The wireless transceiver may include a radio circuit to enable wireless transmission and reception of information. Additionally, the user input system 140 may include a positioning system. The positioning system (e.g. a global positioning system (GPS), a network address (IP address) positioning system, a positioning system based on the nearest cell tower location, or the like) may enable at least the user input system 140 or an external server or computing device in communication with the user input system 140 to determine the location (e.g. location coordinates) of the user input system 140.

Each processor described herein, including the processor 144, generally includes circuitry for implementing the audio, visual, and/or logic functions of the user input system 140. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 147 of the memory 146 of the user input system 140.

Each memory device described herein, including the memory 146 for storing the user application 147 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

As shown in FIG. 1, the memory 146 includes the user application 147. In some embodiments, the user application 147 includes an interface for communicating with, navigating, controlling, configuring, and/or using the user input system 140. In some embodiments, the user application 147 includes computer-executable program code portions for instructing the processor 144 to perform one or more of the functions of the user application 147 described and/or contemplated herein. In some embodiments, the user application 147 may include and/or use one or more network and/or system communication protocols.

Also shown in FIG. 1 is the user interface 149. In some embodiments, the user interface 149 includes one or more output devices, such as a display and/or speaker, for presenting information to the user. In some embodiments, the user interface 149 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user. In some embodiments, the user interface 149 includes the input and display devices of a mobile device, which are operable to receive and display information.

FIG. 1 also illustrates a system 130, in accordance with an embodiment of the present invention. The system 130 may refer to the "apparatus" described herein. The system 130 may include any computerized apparatus that can be configured to perform any one or more of the functions of the system 130 described and/or contemplated herein. In accordance with some embodiments, for example, the system 130 may include a computer network, an engine, a platform, a server, a database system, a front end system, a back end system, a personal computer system, and/or the like. Therefore, the system 130 may be a server managed by the business. The system 130 may be located at the facility associated with the business or remotely from the facility associated with the business. In some embodiments, such as the one illustrated in FIG. 1, the system 130 includes a communication interface 132, a processor 134, and a memory 136, which includes a system application 137 and a structured database 138 stored therein. As shown, the communication interface 132 is operatively and selectively connected to the processor 134, which is operatively and selectively connected to the memory 136.

It will be understood that the system application 137 may be configured to implement any one or more portions of the various user interfaces and/or process flow described herein. The system application 137 may interact with the user application 147. It will also be understood that, in some embodiments, the memory includes other applications. It will also be understood that, in some embodiments, the system application 137 is configured to communicate with the structured database 138, the user input system 140, or the like.

It will be further understood that, in some embodiments, the system application 137 includes computer-executable program code portions for instructing the processor 134 to perform any one or more of the functions of the system application 137 described and/or contemplated herein. In some embodiments, the system application 137 may include and/or use one or more network and/or system communication protocols.

In addition to the system application 137, the memory 136 also includes the structured database 138. As used herein, the structured database 138 may be one or more distinct and/or remote databases. In some embodiments, the structured database 138 is not located within the system and is instead located remotely from the system. In some embodiments, the structured database 138 stores information or data described herein.

It will be understood that the structured database 138 may include any one or more storage devices, including, but not limited to, datastores, databases, and/or any of the other storage devices typically associated with a computer system. It will also be understood that the structured database 138 may store information in any known way, such as, for example, by using one or more computer codes and/or languages, alphanumeric character strings, data sets, figures, tables, charts, links, documents, and/or the like. Further, in some embodiments, the structured database 138 may include information associated with one or more applications, such as, for example, the system application 137. It will also be understood that, in some embodiments, the structured database 138 provides a substantially real-time representation of the information stored therein, so that, for example, when the processor 134 accesses the structured database 138, the information stored therein is current or substantially current.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

In addition, the various portions of the system environment 100 may be maintained for and/or by the same or separate parties. It will also be understood that the system 130 may include and/or implement any embodiment of the present invention described and/or contemplated herein. For example, in some embodiments, the system 130 is configured to implement any one or more of the embodiments of the process flows described and/or contemplated herein in connection any process flow described herein. Additionally, the system 130 or the user input system 140 is configured to initiate presentation of any of the user interfaces described herein.

FIG. 2 illustrates a high-level process flow for mobile device data security system 100, in accordance with an embodiment of the invention. As shown in block 202, the process flow includes establishing a communication link with the mobile device. In one aspect, establishing a communication link includes creating a wireless data channel between the system and the mobile device. Next, as shown in block 204, the process flow includes receiving via the established communication link, information associated with one or more third-party applications stored in a mobile device. In some embodiments, the one or more third-party applications may include a data security application provided for installation on the mobile device of the user. Typically, a third-party application is a computer program designed to run on a mobile device such as smart phones, tablet computers, personal digital assistants (PDA), or the like.

Next, as shown in block 206, the process flow includes initiating a scan, via the established communication link, to determine whether the one or more third-party applications are associated with the malicious code. In some embodiments, the malicious code may be downloaded in combination with the one or more third-party applications. In this regard, the malicious code may be disguised as a game, security patch, utility, or other useful applications. In this way, the user may inadvertently download an application assuming the legitimacy of the application while the application contains malicious code. For example, an application could be repackaged with malware capable of intercepting data transmitted from the mobile device. Each time the user transmits data wirelessly from the mobile device via an unencrypted data channel, the malware inadvertently installed on the mobile device enables the data to be intercepted to gain unauthorized access to sensitive information. In another example, an application could be repackaged with malware capable of capturing any input received by an input device (e.g. keyboard) associated with the mobile device. Each time the user enters information such as a username, password, answer to a challenge question, or the like, the malware inadvertently installed on the mobile device may be able to capture the information and gain unauthorized access to sensitive information.

In some embodiments, the system may be configured to provide a data security application capable of scanning or detecting malicious code (e.g. malware) such as a virus, worm and other forms of data or program that may result in an unexpected and/or unwanted outcome. In some other embodiments, the system may be configured to provide an executable program code distinct from the data security application and capable of scanning or detecting malicious code. In this regard, the system may be configured to establish a database of known malicious code. In this way, during the scanning process the one or more third-party applications are compared with the malicious code stored in the database to determine the match. In some embodiments, the one or more third-party applications may be scanned periodically. In this regard, the system may be configured to automatically initiate the scan. In some other embodiments, the system may be configured to enable the user to initiate the scan manually. In response to scanning the one or more third-party applications, the system may be configured to create a report reflecting the one or more artifacts associated with the one or more third-party applications scanned and whether any malicious code was detected. Due to the growing nature of the exposure associated with the one or more third-party applications stored on mobile devices, the system may be configured to enable periodic updates to the database comprising malicious code.

In some embodiments, the system may be configured to scan one or more components associated with the mobile device in addition to the one or more third-party applications stored on the mobile device. In this way, the system may not only identify the existence of malicious code among the one or more third-party applications, but also determine the effect of the malicious code on one or more components (e.g. a memory device) of the mobile device.

Next, as shown in block 208, the process flow includes transmitting control signals via the established communication link, configured to cause the data security application to begin running in the background of the mobile device in response to determining that the one or more third-party applications are associated with the malicious code. In doing so, data security application may determine one or more actions that may be executed to either remove the malicious code or mitigate the effects of the malicious code. In some embodiments, each action may be specific to a malicious code. In some other embodiments, each action may not be specific to a malicious code.

Next, as shown in block 210, the process flow includes initiating via the data security application, one or more actions to be executed on the mobile device of the user based on at least determining that the one or more third-party applications are associated with the malicious code. In one aspect, the one or more actions limit one or more functionalities of the mobile device. In some embodiments, the one or more actions may be executed automatically by the system in response to determining that the one or more third-party applications are associated with the malicious code. In some other embodiments, the one or more actions may be presented to the user for execution in response to determining that the one or more third-party applications are associated with the malicious code.

Once the one or more actions are executed, the system may receive an indication that the one or more actions have been executed. In response, the system may then initiate the scan via the established communication link to determine whether the one or more third-party applications continue to be associated with the malicious code. In some embodiments, the execution of the one or more actions may have successfully mitigated and/or removed the malicious code associated with the one or more third-party applications. Once the system determines that the one or more third-party applications are no longer associated with the malicious code, the system may then be configured to restore the one or more functionalities of the mobile device.

In one aspect, the system may be configured to limit one or more specific functionalities based on the third-party application determined to have malicious code. In one aspect, the system may disable user access to one or more third-party applications in response to determining that the one or more third-party applications are associated with malicious code. In this regard, the system may disable user access to one or more specific features of the one or more third-party applications determined to be associated with malicious code. In some embodiments, the system may be configured to retrieve one or more user preferences associated with disabling user access. In this regard, the user preferences indicate one or more specific features associated with the third-party applications to which user access is disabled when a malicious code is detected. For example, if an online banking application has been determined to be affected by malicious code, the system may be configured to disable user access to the online banking application completely. In another example, if an email application is determined to be affected by malicious code, the system may be configured to disable any wireless communication transmitted or received from the mobile device.

In some embodiments, the system may be configured to determine a sensitivity score associated with one or more third-party applications indicating which of the one or more third-party applications require protection from unauthorized access to safeguard privacy and/or security of the user. In response, the system may determine one or more specific features associated with the one or more third-party applications based on the sensitivity score associated with the one or more third-party applications.

In some embodiments, restoring the one or more functionalities further comprises requiring the user to establish an authentication requirement to access the mobile device and/or the one or more third-party applications stored in a mobile device. Typically, the user may be required to authenticate identity for access to an application or device, or for access to a particular feature, function or action of an application or device. Numerous types and levels of user authentication exist. For example, a user may authenticate his or her identity using a unique alias such as a username and/or password. Further, in some situations, challenge questions, familiar pictures and/or phrases, biometrics, key fob-based alphanumeric codes and/or collocation, authentication of another application such as a similar application or an "overarching" application, and/or the like may be used as types of identity authentication.

The different types of authentication may provide differing degrees of confidence regarding the authentication using such types. For example, if a username by itself is used for a first user authentication, and a username along with a password is used for a second authentication, then the second authentication should provide a higher confidence regarding the authentication because of the additional layer of authentication required. Further, within the types of authentication, varying levels of confidence may be used. For example, when using a password, an administrator may require users to create a password according to strict rules designed to increase the security level of the pas sword, and therefore increase the confidence of any authentication using the password.

Accordingly, a continuum of authentication may be used to quantify (or dictate) the levels of authentication. Likewise, a continuum of functions permitted may be used to quantify (or dictate) the number or context in which functions are permitted.

Referring to FIG. 3A, a continuum of authentication 300A is illustrated according to embodiments of the invention. On the left-hand side of the continuum, a "zero authentication" requires no authentication credentials. On the right-hand side of the continuum, a "hard authentication" requires full authentication credentials. This means that it requires the strictest combination of credentials. In between the two extremes, "a soft authentication" requires minimal credentials, moderate credentials or most credentials for various points along the continuum. The continuum generally represents the number of credentials required and/or the relative strength of the credentials required for that point on the continuum. As discussed below with reference to FIG. 3C, the continuum of authentication 300A may be coupled with an application functions permitted continuum 300B, first illustrated in FIG. 3B.

Referring to FIG. 3B, the application functions permitted continuum 300B illustrates various levels of application functions permitted. Functions may refer to what a user is permitted to "see" and/or what the user is permitted to "do". More specifically, this may refer to whether a specific function is permitted at a certain point on the continuum and/or the context in which a certain function is permitted. The left-hand side of the continuum indicates that no functions are permitted, and the right-hand side of the continuum indicates that all functions are permitted. In between the extremes, minimal functions are permitted, moderate functions are permitted and most functions are permitted. Thus, any given point along the continuum 400B corresponds with a certain amount and/or number of functions that are permitted and/or the context in which certain functions are permitted.

Referring now to FIG. 3C, a diagram 300C illustrates a coupling of the application functions permitted continuum 300B and the levels of authentication continuum 300A. As shown, the continua 300B and 300A may be coupled with one another such that the various points along the continua intersect at specific points of the coupled continuum. For example, one continuum may be moved left or right with respect to the other continuum in order to achieve a different relationship between the functions permitted and the credentials required. Accordingly, for a given coupling, a specific point on continuum 300B provides that a particular function or functions may be permitted given that a specified level of authentication credentials are supplied, as indicated by the corresponding point on continuum 300A. For example, a financial institution and/or a user may arrange the continua 300B and 300A with respect to one another and may adjust the arrangement based on changing desires or goals.

In some embodiments, one or both the continua 300B and 300A may have weighted scales such that, as a point on the continuum is moved, the corresponding functions permitted and/or level of authentication required may change exponentially or otherwise. Furthermore, in various embodiments, other representations of the various functions permitted that correspond with the various levels of authentication may be used by the invention.

Referring now to FIG. 3D, a diagram 300D illustrates a relationship between the functions permitted and the authentication types. As shown in FIG. 3D, the soft authentication continuum between zero authentication and hard authentication may include one or more authentication types (A, B, C in the Figure). In one aspect, the one or more authentication types corresponding to the one or more authentication credentials received from the user and one or more functions associated with the application permitted for user access are positively correlated. For example, with respect to an online banking application, a username may enable the user to gain access to checking balance, a username and password may enable the user to gain access to checking balance, funds transfer between the user's first bank account and second bank account, and downloading previous statements, and a username, password and challenge question may enable the user to gain complete access to all the functions of the applications and devices. In one aspect, the user may have to provide authentication credentials corresponding to authentication types A and B to gain access to moderate functions associated with the application. For example, the user may provide a username and password to access a balance check and funds transfer. In another aspect, the user may have to provide authentication credentials corresponding to authentication types A, B, and C to gain access to most function associated with the application. For example, the user may provide a username, password, and a personal identification number to access a balance check, a funds transfer, a deposit, and a bill-pay. In yet another aspect, the user may have to only provide authentication credentials corresponding to authentication type A to gain access to minimal functions associated with the application. For example, the user may provide a username to access a balance check.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 14/987,754 | SYSTEM FOR REMOTELY CONTROLLING ACCESS TO A MOBILE DEVICE | Concurrently herewith |
| 14/987,317 | SYSTEM FOR AUTHORIZING ACCESS BASED ON AUTHENTICATION VIA SEPARATE CHANNEL | Concurrently herewith |
| 14/987,553 | SYSTEM FOR ESCALATING SECURITY PROTOCOL REQUIREMENTS | Concurrently herewith |
| 14/987,577 | SYSTEM FOR ASSESSING NETWORK AUTHENTICATION REQUIREMENTS BASED ON SITUATIONAL INSTANCE | Concurrently herewith |

What is claimed is:
1. A mobile device data security system, the system comprising:
at least one non-transitory storage device;
at least one processor; and
at least one module stored in said storage device and comprising instruction code that is executable by the at least one processor and configured to cause said at least one processor to:

provide a data security application for installation on a mobile device of a user;

establish a communication link with the mobile device, wherein establishing further comprises creating a wireless data channel with the mobile device;

receive, via the established communication link, information associated with one or more third-party applications stored on the mobile device;

initiate a scan, via the established communication link, to determine whether the one or more third-party applications and one or more components associated with the mobile device are associated with a malicious code;

transmit control signals, via the established communication link, configured to cause the data security application to begin running in the background of the mobile device in response to determining that the one or more third-party applications and the one or more components associated with the mobile device are associated with the malicious code;

initiate, via the data security application, one or more actions to be executed on the mobile device of the user based on at least determining that the one or more third-party applications and the one or more components associated with the mobile device are associated with the malicious code, wherein initiating further comprises retrieving one or more user preferences associated with the one or more actions to be executed on the mobile device of the user, wherein the one or more actions limit one or more functionalities of the mobile device, wherein limiting further comprises disabling user access to one or more specific features associated with the one or more third-party applications, wherein the one or more user preferences comprises identifying the one or more specific features in each of the one or more third-party applications to be disabled;

determine a sensitivity score associated with the one or more third-party applications indicating which of the one or more third-party applications requires protection from unauthorized access to safeguard privacy and/or security of the user;

determine one or more specific features associated with the one or more third-party applications to disable based on at least the sensitivity score associated with the one or more third-party applications;

execute, via the data security application, the one or more actions on the mobile device of the user;

receive, via the data security application, a user input requesting access to at least one of the one or more specific features disabled due to the malicious code;

determine a level of authentication required to access the at least one of the one or more specific features disabled due to the malicious code;

receive, via the data security application, one or more authentication credentials associated with the user;

determine that the one or more authentication credentials received from the user meets the level of authentication required to access the at least one of the one or more specific features disabled due to the malicious code; and restore user access to the at least one of the one or more specific features disabled due to the malicious code based on at least determining that the one or more authentication credentials meets the level of authentication required to access the at least one of the one or more specific features, wherein limiting further comprises disabling all wireless communication transmitted or receive from the mobile device.

2. The system of claim 1, wherein the module is further configured to cause the at least one processor to:

determine one or more actions to be taken by the user in response to determining that the one or more third-party applications are associated with the malicious code, wherein the one or more actions mitigates one or more effects of the malicious code; and transmit, via the established communication link, the one or more actions to the user.

3. The system of claim 2, wherein the module is further configured to cause the at least one processor to:

receive an indication that the user has executed the one or more actions;

initiate a scan, via the established communication link, to determine whether the one or more third-party applications continue to be associated with the malicious code;

determine that the one or more third-party applications are not associated with the malicious code; and restore the one or more functionalities of the mobile device in response to determining that the one or more third-party applications are not associated with the malicious code.

4. The system of claim 1, wherein the module is further configured to cause the at least one processor to determine that the malicious code is associated with tracking the user's use of an input device associated with the mobile device.

5. The system of claim 1, wherein the module is further configured to cause the at least one processor to disable user access to the one or more third-party applications in response to determining that the one or more third-party applications are associated with the malicious code.

6. A computerized method for remotely controlling access to a mobile device, the method comprising:

providing, using a computing device processor, a data security application for installation on a mobile device of a user;

establishing, using a computing device processor, a communication link with the mobile device, wherein establishing further comprises creating a wireless data channel with the mobile device;

receiving, via the established communication link, information associated with one or more third-party applications stored on the mobile device;

initiating a scan, via the established communication link, to determine whether the one or more third-party applications and one or more components associated with the mobile device are associated with a malicious code;

transmitting control signals, via the established communication link, configured to cause the data security application to begin running in the background of the mobile device in response to determining that the one or more third-party applications and one or more components associated with the mobile device are associated with the malicious code; and initiating, via the data security application, one or more actions to be executed on the mobile device of the user based on at least determining that the one or more third-party applications and one or more components associated with the mobile device are associated with the malicious code, wherein initiating further comprises retrieving one or more user preferences associated with the one or more actions to be executed on the mobile device of the user, wherein the one or more actions limit one or more functionalities of the mobile device, wherein limiting further comprises disabling user access to one or more specific features associated with the one or more third-party applications, wherein the one or more user preferences comprises identifying the one or more specific features in each of the one or more third-party applications to be disabled;

determining, using a computing device processor, a sensitivity score associated with the one or more third-party applications indicating which of the one or more third-party applications requires protection from unauthorized access to safeguard privacy and/or security of the user;

determining, using a computing device processor, one or more specific features associated with the one or more third-party applications to disable based on at least the sensitivity score associated with the one or more third-party applications;

executing, via the data security application, the one or more actions on the mobile device of the user;

receiving, via the data security application, a user input requesting access to at least one of the one or more specific features disabled due to the malicious code;

determining, using a computing device processor, a level of authentication required to access the at least one of the one or more specific features disabled due to the malicious code;

receiving, via the data security application, one or more authentication credentials associated with the user;

determining, using a computing device processor, that the one or more authentication credentials received from the user meets the level of authentication required to access the at least one of the one or more specific features disabled due to the malicious code; and restoring, via the data security application, user access to the at least one of the one or more specific features disabled due to the malicious code based on at least determining that the one or more authentication credentials meets the level of authentication required to access the at least one of the one or more specific features, wherein limiting further comprises disabling all wireless communication transmitted or receive from the mobile device.

7. The method of claim 6, wherein the method further comprises:
determining one or more actions to be taken by the user in response to determining that the one or more third-party applications are associated with the malicious code, wherein the one or more actions mitigates one or more effects of the malicious code; and
transmitting, via the established communication link, the one or more actions to the user.

8. The method of claim 7, wherein the method further comprises:
receiving an indication that the user has executed the one or more actions;
initiating a scan, via the established communication link, to determine whether the one or more third-party applications continue to be associated with the malicious code;
determining that the one or more third-party applications are not associated with the malicious code; and
restore the one or more functionalities of the mobile device in response to determining that the one or more third-party applications are not associated with the malicious code.

9. The method of claim 6, wherein the method further comprises determining that the malicious code is associated with tracking the user's use of an input device associated with the mobile device.

10. The method of claim 6, wherein the module is further configured to cause the at least one processor to disable user access to the one or more third-party applications in response to determining that the one or more third-party applications are associated with the malicious code.

11. A computer program product for mobile device data security system, the computer program product comprising a non-transitory computer-readable medium comprising code causing a first apparatus to:

provide a data security application for installation on a mobile device of a user;

establish a communication link with the mobile device, wherein establishing further comprises creating a wireless data channel with the mobile device;

receive, via the established communication link, information associated with one or more third-party applications stored on the mobile device;

initiate a scan, via the established communication link, to determine whether the one or more third-party applications and one or more components associated with the mobile device are associated with a malicious code;

transmit control signals, via the established communication link, configured to cause the data security application to begin running in the background of the mobile device in response to determining that the one or more third-party applications and the one or more components associated with the mobile device are associated with the malicious code;

initiate, via the data security application, one or more actions to be executed on the mobile device of the user based on at least determining that the one or more third-party applications and the one or more components associated with the mobile device are associated with the malicious code, wherein initiating further comprises retrieving one or more user preferences associated with the one or more actions to be executed on the mobile device of the user, wherein the one or more actions limit one or more functionalities of the mobile device, wherein limiting further comprises disabling user access to one or more specific features associated with the one or more third-party applications, wherein the one or more user preferences comprises identifying the one or more specific features in each of the one or more third-party applications to be disabled;

determine a sensitivity score associated with the one or more third-party applications indicating which of the one or more third-party applications requires protection from unauthorized access to safeguard privacy and/or security of the user;

determine one or more specific features associated with the one or more third-party applications to disable based on at least the sensitivity score associated with the one or more third-party applications;

execute, via the data security application, the one or more actions on the mobile device of the user;

receive, via the data security application, a user input requesting access to at least one of the one or more specific features disabled due to the malicious code;

determine a level of authentication required to access the at least one of the one or more specific features disabled due to the malicious code;

receive, via the data security application, one or more authentication credentials associated with the user;

determine that the one or more authentication credentials received from the user meets the level of authentication required to access the at least one of the one or more specific features disabled due to the malicious code; and restore user access to the at least one of the one or more specific features disabled due to the malicious code based on at least determining that the one or more authentication credentials meets the level of authentication required to access the at least one of the one or more specific features, wherein limiting further comprises disabling all wireless communication transmitted or receive from the mobile device.

12. The computer program product of claim 11, wherein the first apparatus is further configured to cause the at least one processor to:

determine one or more actions to be taken by the user in response to determining that the one or more third-party applications are associated with the malicious code, wherein the one or more actions mitigates one or more effects of the malicious code; and transmit, via the established communication link, the one or more actions to the user.

13. The computer program product of claim 11, wherein the first apparatus is further configured to cause the at least one processor to:

receive an indication that the user has executed the one or more actions;

initiate a scan, via the established communication link, to determine whether the one or more third-party applications continue to be associated with the malicious code;

determine that the one or more third-party applications are not associated with the malicious code; and restore the one or more functionalities of the mobile device in response to determining that the one or more third-party applications are not associated with the malicious code.

14. The computer program product of claim 12, wherein the first apparatus is further configured to cause the at least one processor to determine that the malicious code is associated with tracking the user's use of an input device associated with the mobile device.

* * * * *